US006910540B2

(12) United States Patent
Totsu

(10) Patent No.: US 6,910,540 B2
(45) Date of Patent: Jun. 28, 2005

(54) TORQUE CONTROL SYSTEM FOR ELECTRICALLY DRIVEN ROTATING TOOLS

(76) Inventor: Katsuyuki Totsu, 32-13, Oshiage 1-chome, Sumida-ku, Tokyo (JP)

( * ) Notice: Subject to any disclaimer, the term of this patent is extended or adjusted under 35 U.S.C. 154(b) by 0 days.

(21) Appl. No.: 10/476,024

(22) PCT Filed: Apr. 18, 2002

(86) PCT No.: PCT/JP02/03861

§ 371 (c)(1), (2), (4) Date: Oct. 24, 2003

(87) PCT Pub. No.: WO02/087829

PCT Pub. Date: Nov. 7, 2002

(65) Prior Publication Data

US 2004/0115014 A1 Jun. 17, 2004

(30) Foreign Application Priority Data

Apr. 25, 2001 (JP) .................................... 2001-127033

(51) Int. Cl.[7] .................................... B23Q 5/00
(52) U.S. Cl. .................................... 173/178; 173/181
(58) Field of Search .................................... 173/178, 181, 173/6, 176, 179, 180, 2, 182

(56) References Cited

U.S. PATENT DOCUMENTS 4,328,871 A * 5/1982 Gluskin .................... 173/178
4,429,775 A * 2/1984 Teramoto .................... 477/178
4,448,098 A * 5/1984 Totsu .................... 81/467
4,823,885 A * 4/1989 Okumura .................... 173/178
4,986,369 A * 1/1991 Fushiya et al. .................... 173/178
5,134,909 A * 8/1992 Sasaki .................... 81/473
5,201,374 A * 4/1993 Rahm .................... 173/178
5,458,206 A * 10/1995 Bourner et al. .................... 173/178
5,738,177 A * 4/1998 Schell et al. .................... 173/178

FOREIGN PATENT DOCUMENTS

JP 60-3960 1/1985
JP 60-13798 4/1985
JP 61-38874 2/1986

OTHER PUBLICATIONS

Totsu, Katsuyuki, Electric Rotary Tool With Built–In Recoilles Clutch Mechanism, Jan. 29, 1998, WO98/03311.*

* cited by examiner

*Primary Examiner*—Stephen F. Gerrity
*Assistant Examiner*—Brian Nash
(74) *Attorney, Agent, or Firm*—Koda & Androlia

(57) ABSTRACT

A torque control system for electrically driven rotating tools capable of always properly and efficiently effecting constant-torque tightening of screws or the like and capable of easily achieving the miniaturization of the whole device and the improvement in torque control accuracy, the torque control system comprising a clutch mechanism that, when a load torque of predetermined value or above acts on a driven shaft joined to the output shaft of an electric motor, operates to cut off the engagement between the output shaft and the driven shaft, a torque setting mechanism that adjusts the engagement point for the clutch mechanism, and a torque detecting mechanism (42) for detecting the clutch operation of the clutch mechanism to effect drive stop control of the electric motor, wherein the torque detecting mechanism (42) is set so that it effects drive stop control of the electric motor simultaneously with the detecting operation thereof in a state in which the clutch operation has been completed as the cam engagement at the cam engagement portion **(40*a*)** of the clutch mechanism is completely canceled.

4 Claims, 3 Drawing Sheets

TORQUE CONTROL SYSTEM FOR ELECTRICALLY DRIVEN ROTATING TOOLS

TECHNICAL FIELD

The present invention relates to a torque control system for electrically driven rotating tools such as electric drivers, etc. and more particularly to a torque control system for electrically driven rotating tools in which in cases where a load torque that exceeds a preset value is received by the driven shaft of the electrically driven rotating tool, this state is detected by the operation of a clutch mechanism, and a control action is performed so that the driving of the electric motor is appropriately stopped.

BACKGROUND ART

Conventionally, as electrically driven rotating tools such as electric drivers, etc., which are driven by electric motors, tools have been proposed and worked which are constructed so that in cases where a strong counter-load is applied to the driver bit during the tightening of screws, etc., a state in which a specified torque value is reached is detected by a clutch mechanism which operates at a preset tightening torque, and the clutch mechanism operates to temporarily sever the coupling between the output shaft of the electric motor and the driven shaft (driver bit). Furthermore, electric drivers, etc., which are constructed so that when the clutch mechanism operates, this state is detected by a limit switch, etc., and the driving of the electric motor is stopped, have also seen practical application (Japanese Patent Application Publication (Kokoku) No. 60-13798).

More specifically, electric drivers equipped with such a clutch mechanism includes a structure comprised of an automatic clutch device in which, for example, the output shaft of the electric motor is coupled to the driver bit via a planetary gear speed reduction mechanism, an internal gear which engages with the planetary gears of this planetary gear speed reduction mechanism is loosely fit inside a grip portion casing so that this internal gear can rotate, this internal gear and one end of the grip portion casing are respectively closed off and caused to face each other, a through-hole is formed in the facing surface of the grip portion casing, a steel ball is accommodated in this through-hole, and this steel ball is elastically held by a flange-equipped sleeve from the outside of the grip portion casing so that the steel ball is inserted into and caused to contact the inside of a cam groove formed in the facing surface of the internal gear.

Furthermore, in the above-described automatic clutch device, the rotational output from the output shaft of the electric motor is transmitted to the driver bit via the planetary gear speed-reduction mechanism in the tightening work of screws or the like; and as the completion of such tightening of a screw is approached, a counter-load is transmitted to the planetary gear speed-reduction mechanism from the driver bit, and this acts to cause rotation of the internal gear via the planetary gears. Accordingly, when this counter-load overcomes the elastic force that is pressing the steel ball, in other words, when this load exceeds a specified set torque, the internal gear rotates so that the steel ball rides over the cam groove formed in the facing surface of the internal gear; as a result, the coupling between the output shaft of the electric motor and the driver bit is temporarily severed. Accordingly, it is possible to alter the engagement point of the clutch device, i.e., the set value of the torque, by adjusting the elastic force of the flange-equipped sleeve that holds the steel ball.

An automatic power cut-off device for electrically driven rotating tools which is devised so that the driving of the electric motor can be simply stopped by using a combination of a magnet piece and an magnetic detection element (Hall element) as means for detecting the actuation of the clutch mechanism, and constructing a circuit that cuts off the power to the electric motor, which includes the magnetic detection element, is also proposed (Japanese Patent Application Publication (Kokoku) No. 60-3960).

Furthermore, in electrically driven rotating tools of this type, an external AC power supply (commercial power supply) is generally used for driving control of the electric motor; in such cases, a control unit which has an AC/DC power conversion function and a torque control function, etc. is used in order to obtain a power supply output suitable for the driving of an electric motor from such an external AC power supply. In cases where an ordinary small DC motor is used as the electric motor, this control unit is constructed as a unit that is independent of the electrically driven rotating tool, and driving control of the electric motor is accomplished by connecting this control unit between the AC power supply and the electrically driven rotating tool.

Nowadays, furthermore, in regard to DC motors, the use of brushless motors which are superior in terms of characteristics such as non-contact operation, prevention of noise, high torque and small size, high-speed rotation and long useful life, etc., and which offer the advantage of being maintenance-free, as electric motors in electrically driven rotating tools, has been proposed; and such motors have seen practical use. In the driving control of such brushless motors, unlike the case of the DC motors, a driving circuit that generates a rotating magnetic field is required. Furthermore, such a driving circuit can be constructed by means of a magnetic pole sensor which detects the positions of the magnetic poles of the magnet rotor (generally, a Hall element is used), a driving coil which is excited in accordance with the rotor magnetic pole positions so that a rotational force in a fixed direction is applied, and a special IC circuit which powers and controls the magnetic pole sensor and driving coil.

The driving circuit constructed in this manner can be accommodated inside the grip portion casing of the electrically driven rotating tool as a compact circuit structure together with a circuit which has a torque control function, etc. Accordingly, in cases where a brushless motor is used, a control unit having a structure that is independent of the electrically driven rotating tool is unnecessary; only an AC/DC converter is required, and the driving circuit, etc., can be contained in the electrically driven rotating tool and built with a simple structure, so that handling can be simplified.

In a conventional electrically driven rotating tool, as described above, micro-switches, limit switches, etc. are used in the torque detection mechanism, etc., beginning with the driving switch that initiates the driving of the electric motor; accordingly, sparks, etc. are generated at the switch contact points during the operation of the switches, and this leads not only to wear of the contact points, but also various problems with respect to the peripheral electronic parts, electronic devices and electronic circuits, etc. Accordingly, in the case of such mechanical switching mechanisms, there are structural limits to how far compactness and an increase in the useful life can be achieved, and the degree to which the electrically driven rotating tool as a whole can be made more compact is also subject to many restrictions in terms of structure and disposition.

The inventor of the present application conducted diligent research and the structure of prototypes in order to solve such problems. As a result, the inventor discovered that the power circuit, etc. can also be made extremely small and compact by using combinations of magnets and magnetic sensors as switches, such as the driving switch and torque detection mechanism, etc., that are accommodated inside the grip portion casing of an electrically driven rotating tool. In particular, the inventor ascertained that in cases where a brushless motor is used as the electric motor, the driving switch and the like can all be compactly accommodated inside the grip portion casing of the electrically driven rotating tool along with the driving control circuit of the electric motor, so that handling can be simplified.

However, in cases where a brushless motor is used as the electric motor, in the control of the torque, the operating characteristics of the motor, especially in regard to the rotation of the rotor, are set so that the inertial moment is extremely small as in a stepping motor; accordingly, the system has characteristics in that in the case of stop control of the brushless motor, the rotor immediately stops rotating without any inertial force. Consequently, in cases where torque control is performed by installing a conventional clutch mechanism, some difficulties are encountered. Namely, for example, as the completion of the tightening of the screw is approached, a counter-load is transmitted to the planetary gear speed reduction mechanism from the driver bit; and when the torque detection mechanism performs a detection and stops the driving of the motor at the clutch engagement point at which this counter-load overcomes the elastic force that is pressing the steel ball, so that the torque exceeds the specified set torque, thus causing the internal gear to rotate so that the steel ball rides over the cam groove formed in the facing surface of the internal gear, then the driving power supply of the motor is cut off without the steel ball completely riding over the cam groove; as a result, the driver bit rotates back so that the tightening of the screw at the specified torque cannot be completed.

Accordingly, the present inventor conducted further diligent research and investigations. As a result, the inventor discovered that the above-described problems can be completely solved by constructing an electrically driven rotating tool so that a driven shaft is coupled as an working shaft to the output shaft of an electric motor via a speed-reduction mechanism, a clutch mechanism equipped with a cam engaging section which operates so that the engagement between the output shaft and the driven shaft is cut of when a load torque that exceeds a predetermined value acts on the driven shaft is installed, a torque setting mechanism in which the engagement point of the clutch mechanism is adjusted as a set torque value is provided, and a torque detection mechanism which performs a drive stop control of the electric motor at the same time that the actuation of the clutch mechanism is detected; and in this electrically driven rotating tool, the torque detection mechanism is set so that a drive stop control of the electric motor is performed at the same time as the detection operation in a state in which the cam engagement in the cam engaging section of the clutch mechanism is completely released and the clutch operation is completed.

Furthermore, in cases where a torque setting mechanism is installed in an electrically driven rotating tool equipped with the above-described torque detection mechanism, a structure in which the torque setting mechanism is concentric with the driven shaft in correspondence with the clutch mechanism is taken. As a result, there is frictional contact between the torque setting mechanism and the driven shaft, and the precision of the torque control effected by the torque setting mechanism with respect to the clutch mechanism tends to drop. In view of this, the inventor discovered that by way of using an independent structure in which the torque setting mechanism that is disposed so as to face the clutch mechanism is provided at an inclination so that the torque setting mechanism is not concentric with the driven shaft, it is possible that an adjustment of the torque by means of the torque setting mechanism is simply performed at any time without removing the driver bit as in a conventional system, and the precision of torque control such as torque setting and torque detection, etc. is conspicuously improved.

Accordingly, the object of the present invention is to provide a torque control system for an electrically driven rotating tool that is equipped with a clutch mechanism that cuts off the engagement between the output shaft and the driven shaft when a load torque that exceeds a predetermined value acts on the driven shaft; and in the system of the present invention, a drive stop control of the electric motor is performed at the same time as the detection operation by a magnetic sensor when a state is reached in which the clutch operation of the clutch mechanism is completed, thus making it possible for the constant-torque tightening of screws, etc. to be performed appropriately and with good efficiency at all times, and also making it possible to achieve easily an increased compactness of the device as a whole and an improved torque control precision.

DISCLOSURE OF THE INVENTION

So as to accomplish the above object, in the torque control system of the present invention for an electrically driven rotating tool, the tool comprises: a grip portion containing therein an electric motor, a driven shaft coupled to an output shaft of the electric motor via a speed-reduction mechanism so as to be used as a working shaft, a clutch mechanism equipped with a cam engaging section which operates to sever a coupling between the output shaft and the driven shaft when a load torque that exceeds a predetermined value acts on the driven shaft, a torque setting mechanism in which an actuation point of the clutch mechanism is adjusted as a set torque value, and a torque detection mechanism which detects a clutch operation (disengagement) of the clutch mechanism and performs a drive stop control of the electric motor; and the torque control system of the present invention is characterized in that the torque detection mechanism is set so that when a cam engagement in the cam engaging section of the clutch mechanism is completely released so that the clutch operation is completed, the drive stop control of the electric motor is performed at the same time as a detection of the clutch operation.

In the above structure, the torque detection mechanism can be constructed by a combination of a magnet and a magnetic sensor so that the detection of the clutch operation is performed in a state in which the cam engagement is completely released.

Furthermore, the torque control system of the present invention is for an electrically driving rotating tool that is comprised of: a grip portion containing therein an electric motor, a driven shaft coupled to an output shaft of the electric motor via a planetary gear speed-reduction mechanism so as to be used as a working shaft, an internal gear rotatably disposed in a cylindrical grip portion casing that surrounds the planetary gear speed-reduction mechanism, the internal gear engaging with a planetary gear of the speed-reduction mechanism, a clutch mechanism that effects cam engagement in a location between the internal gear and the cylindrical grip portion casing so that when a load torque that exceeds a predetermined value acts on the driven shaft, the cam engagement of the clutch mechanism is released, and engagement between the output shaft and the driven shaft is effected, a torque setting mechanism in which an actuation point of the clutch mechanism is adjusted as a set torque value, and a torque detection mechanism which detects the clutch operation (disengagement) of the clutch mechanism and performs a drive stop control of the electric motor; and the torque control system of the present invention is characterized in that: the torque detection mechanism is comprised of a magnet which is disposed on one portion of an outside wall of the internal gear and a magnetic sensor which is disposed so as to face the magnet; and the magnetic sensor is disposed so as to perform, when a cam engagement is completely released and the clutch operation is completed, a detection of the clutch operation with respect to the magnet which is caused to move by the rotation of the internal gear that is caused by the clutch operation of the clutch mechanism.

In the above structure, the clutch mechanism can be comprised of: a clutch cam surface, which has a projecting portion used to perform the clutch operation and is formed on an outside surface of a closed bottom portion of the internal gear, and a steel ball, which is disposed in a position that corresponds to the projecting portion of the clutch cam surface; wherein the steel ball is elastically held, via a torque adjustment spring which is used as a torque setting mechanism, in an upper end portion of a sleeve which is disposed concentrically with the driven shaft.

Furthermore, the clutch mechanism can be comprised of: a clutch cam surface having a projecting portion used to perform the clutch operation and formed on an outside surface of a conical shape closed bottom portion of the internal gear, and a steel ball disposed in a position that corresponds to the projecting portion of the clutch cam surface, so that the steel ball is independently elastically held, via a torque adjustment means such as a torque adjustment spring used as a torque setting mechanism, in an inclined orientation with respect to the driven shaft.

In the above structures, the clutch mechanism can be comprised of: the clutch cam surface which is formed on a part of the internal gear that engages with the planetary gear of the planetary gear speed-reduction mechanism and which has the projecting portion used to perform the clutch operation that cuts off the engagement between the output shaft and the driven shaft, and the steel ball which is held by the torque adjustment means such as torque adjustment springs and which elastically contacts the clutch cam surface; wherein when a load torque exceeds a preset torque value during the forward rotation of the driven shaft, the projecting portion of the clutch cam surface rides over the steel ball so that the internal gear is rotated inside the grip portion casing.

Furthermore, in the torque control system of the present invention, the electric motor of the electrically driven rotating tool can be a brushless motor.

(Description of the Reference Numerals)

| | | | |
|---|---|---|---|
| 10 | Electrically driven rotating tool | 12, 12' | Clutch mechanism |
| 14 | Output shaft of electric motor M | 16 | Pinion gear |
| 18 | Planetary gear mechanism | 20 | Planetary gear |
| 22 | Internal gear | 22a | Closed bottom portion |
| 24 | Grip portion casing | 26 | Gear case |
| 28, 28' | One-way clutch | 30 | Driven shaft |
| 32 | Steel ball | 34 | Hole |
| 36, 36' | Torque adjustment spring | 38 | Sleeve |
| 40 | Clutch cam surface | 40a | Projecting portion |
| 40b | Apex | 42 | Torque detection mechanism |
| 43 | Magnet | 44 | Magnetic sensor |

BEST MODE FOR CARRYING OUT THE INVENTION

Next, embodiments of the torque control system for electrically driven rotating tools provided by the present invention will be described in detail below with reference to the accompanying drawings.

Figure 1:
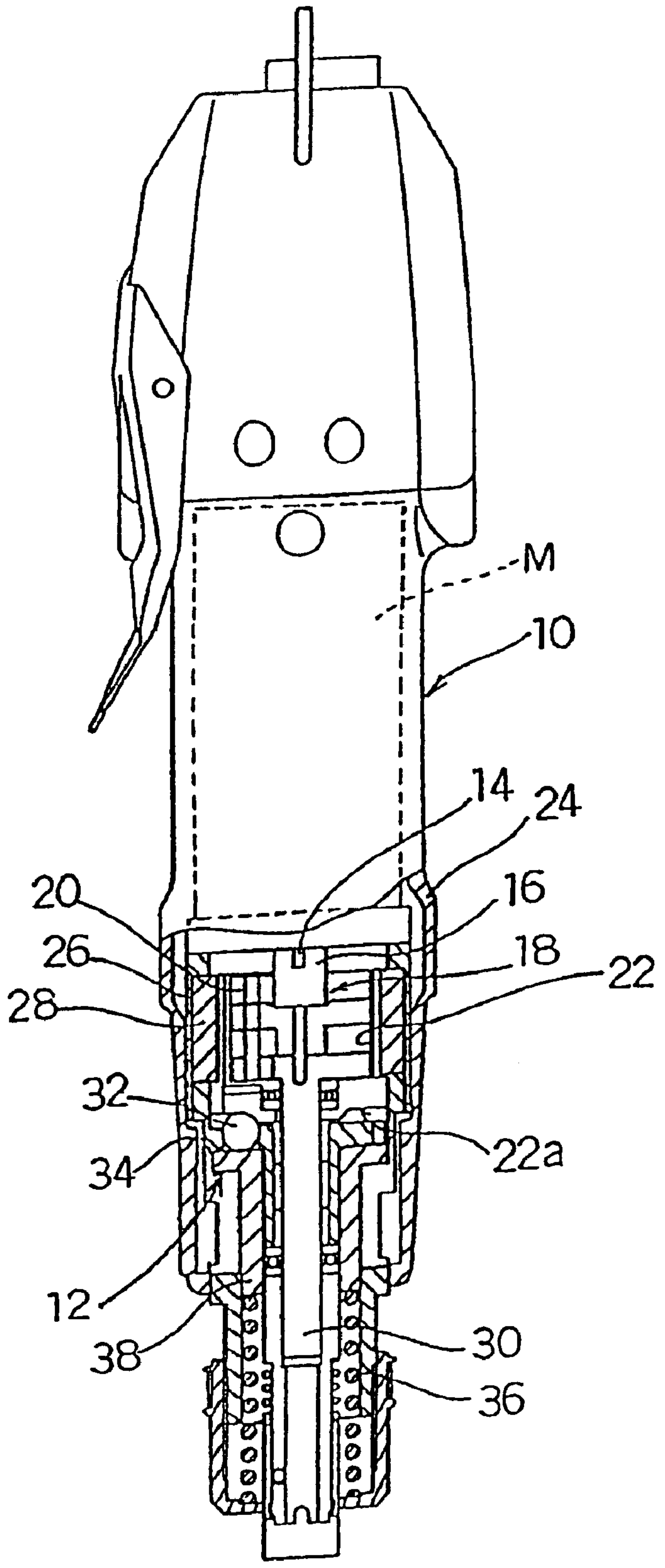
FIG. 1 is a schematic sectional view of the essential portion of one embodiment of the electrically driven rotating tool that uses the torque control system of the present invention.

FIG. 1 is a schematic sectional view of the essential portion of one embodiment of an electrically driven rotating tool working the torque control system for electrically driven rotating tools provided by the present invention. More specifically, in FIG. 1, the reference numeral 10 indicates an electrically driven rotating tool such as an electric driver, etc., which contains an electric motor M which is a brushless motor, etc. A pinion gear 16 is fastened to the tip end of the output shaft 14 of the electric motor M, and a speed-reduction mechanism including a planetary gear mechanism 18 is connected to the output shaft 14 by engagement via this pinion gear 16. An internal gear 22 that engages with the planetary gear 20 of this planetary gear mechanism 18 is disposed on the outer circumference of this planetary gear mechanism 18.

The internal gear 22 is fastened by press-fitting to the inner circumferential portion of a gear case 26 which is fastened and disposed inside the cylindrical grip portion casing 24 of the electrically driven rotating tool 10 so that this internal gear 22 can rotate in a fixed direction via a one-way clutch 28. In this case, when the output shaft 14 of the electric motor M is caused to rotate in the forward direction, the planetary gear mechanism 18 rotates in the same direction as the output shaft 14. In this case, the internal gear 22 is coupled to the one-way clutch 28 so that this gear can rotate in the opposite direction from the planetary gear mechanism 18.

Furthermore, a driven shaft 30 whose central portion is coaxially connected to the output shaft 14 via the planetary gear mechanism 18 is passed through the closed bottom portion 22*a* of the internal gear 22, and a clutch cam surface 40 (see FIG. 2) on which a projecting portion 40*a* that is used to perform the clutch operation is disposed is formed on the outside surface of the closed bottom portion 22*a* of the internal gear 22. Furthermore, a hole 34 which is used to insert a steel ball 32 is formed in the bottom surface of the gear case 26 in a position that corresponds to the projecting portion 40*a* of the clutch cam surface 40, and a clutch mechanism 12 is provided so that the steel ball 32 which is inserted into the hole 34 is elastically held by a sleeve 38 which is pushed upward by a torque adjustment spring 36 which is a coil spring that constitutes a torque setting mechanism.

Furthermore, in the embodiment of the electrically driven rotating tool 10 that is shown in FIG. 1, the tip end portion of the driven shaft 30 is constructed as a bit chuck mechanism which allows the detachable connection of a driver bit, etc. (not shown in the drawings), which is used to tighten nuts or bolts.

Figure 2:
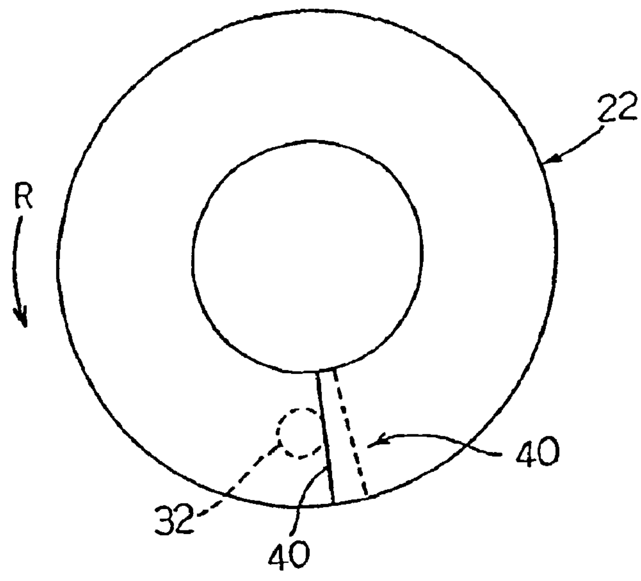
FIG. 2 is a schematic bottom view of the internal gear which of one example of the shape and structure of the clutch cam surface in the internal gear that forms the clutch mechanism in the electrically driven rotating tool shown in FIG. 1.

FIG. 2 shows the outside surface of the closed bottom portion 22*a* of the internal gear 22. The internal gear 22 is provided with clutch cam surface 40 on which the projecting portion 40*a* that is used to perform the above-described clutch operation is disposed. More specifically, FIG. 2 shows a state in which the steel ball 32 that constitutes the clutch mechanism 12 is anchored on the projecting portion 40*a* of the clutch cam surface 40 with respect to the direction of forward rotation (indicated by curved arrow R) of the driven shaft 30.

Figure 3A:
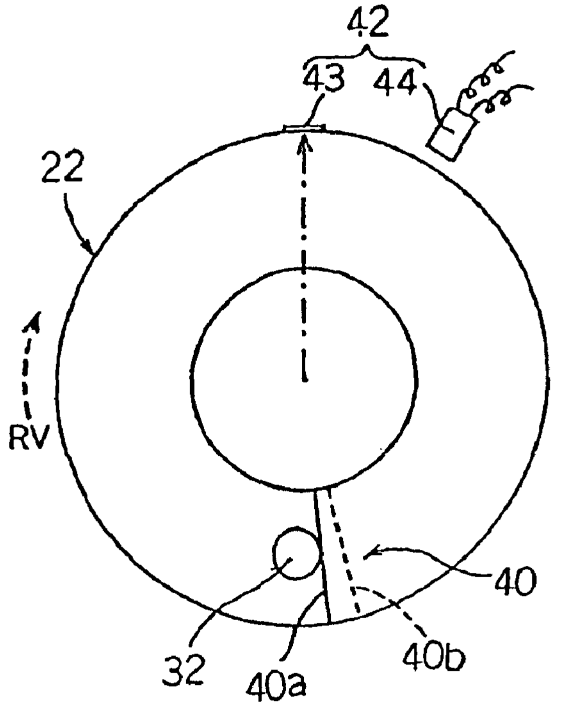
FIG. 3 shows an example of the structure and disposition of the torque detection mechanism of the clutch mechanism shown in FIG. 2 in which FIG. 3(*a*) is an explanatory diagram of the structure and disposition prior to the clutch operation, and FIG. 3(*b*) is an explanatory diagram of the structure and disposition following the clutch operation.
Figure 3B:
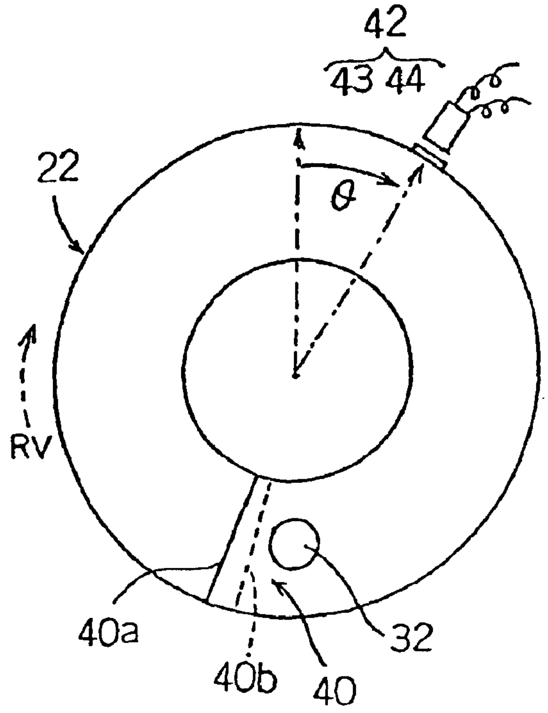

Furthermore, in the electrically driven rotating tool 10 of the present embodiment, as is shown in FIGS. 3(*a*) and 3(*b*), a magnet 43 is fastened to and disposed on one side portion of the outer circumference of the internal gear 22, and a magnetic sensor 44 which is a Hall element, etc., is disposed in a position which faces the magnet 43 when the internal gear 22 is rotationally displaced by a specified angle of θ, as a torque detection mechanism 42 which detects the clutch operation (disengagement) of the clutch mechanism 12 and simultaneously performs a drive stop control of the electric motor M.

Accordingly, the appropriate disposition of the magnet 43 and magnetic sensor 44 of the torque detection mechanism 42 will be described along with the detection operation of this detection mechanism 42 with reference to FIGS. 3(*a*) and 3(*b*).

First, in cases where screw tightening work is to be performed using the electrically driven rotating tool of the present embodiment, the steel ball 32 and the projecting portion 40*a* of the clutch cam surface 40 of the internal gear 22 are elastically engaged in the direction of propulsion of the driven shaft 30 in the clutch mechanism 12, so that the internal gear 22 is anchored inside the gear case 26. Accordingly, the rotation driving force of the electric motor M that is transmitted via the output shaft 14 is transmitted to the planetary gear 20 via the pinion gear 16, so that the planetary gear is caused to revolve while rotating. Consequently, the driven shaft that is engaged with the planetary gear mechanism 18 is rotationally driven at a reduced speed, so that the tightening of screws or bolts can be performed (see FIG. 3(*a*)).

Next, when the tightening torque (load torque) reaches a preset specified torque value in such tightening of screws, etc., the rotation of the driven shaft 30 stops, and the rotational force transmitted from the output shaft 14 of the electric motor M is transmitted to the internal gear 22 by the rotational motion of the planetary gear 20 of the planetary gear mechanism 18 via the pinion gear 16. Then, when the load torque exceeds a predetermined value, the steel ball 32 that has up until now been elastically engaged with the projecting portion 40*a* of the clutch cam surface 40 disposed on the outside surface of the closed bottom portion 22*a* of the internal gear 22 is pushed downward (see FIG. 1), so that the projecting portion 40*a* rides over the steel ball 32, thus releasing the engagement between the projecting portion 40*a* and steel ball 32. In other words, the clutch operation is accomplished. As a result, the internal gear 22 rotates through the interior of the gear case along with the planetary gear 20, so that the transmission of a rotational driving force from the output shaft 14 to the driven shaft 30 is cut off.

In this case, when the projecting portion 40*a* of the clutch cam surface 40 disposed on the outside surface of the closed bottom portion 22*a* of the internal gear 22 rides over the steel ball 32 so that the internal gear 22 rotates in reverse (i.e., in the direction indicated by curved dotted arrow RV), the displacement of the steel ball 32 which makes contact at the apex 40*b* (indicated by a broken line) of the projecting portion 40*a* reaches a maximum value. Consequently, if torque detection is accomplished by means of a limit switch, etc., at this maximum displacement position as in a conventional system, and a drive stop control of the electric motor M (especially an electric motor which is set with a small inertial moment such as a brushless motor) is performed, the projecting portion 40*a* cannot ride over the steel ball 32, and there is an inertia which causes a return to the original position (see FIG. 3(*a*)). In this case, therefore, the tightening of the screw at a set torque cannot be completed.

Accordingly, in the present invention, when the torque detection mechanism 42 is set, as is shown in FIGS. 3(*a*) and 3(*b*), the magnet 43 is fastened to and disposed on one side portion of the outer circumference of the internal gear 22, and the position of the magnetic sensor 44 that is disposed with respect to this magnet 43 is set in a position that faces the magnet 43 disposed on the internal gear 22 in a state in which the contact position of the steel ball 32 has completely passed the apex 40*b* (indicated by a broken line) of the projecting portion 40*a* of the clutch cam surface 40 disposed on the outside surface of the closed bottom portion 22*a* of the internal gear 22 when the projecting portion 40*a* rides over the steel ball 32, i.e., in a state in which the clutch operation has been completed (see FIG. 3(*b*)).

As a result of the torque detection mechanism 42 being set in this manner, a counter-load is transmitted to the planetary gear mechanism 18 from the driver bit in the vicinity of completion of screw tightening, this counter-load overcomes the elastic force that is pressing the steel ball 32 so that the torque exceeds the above-described specified set torque, and the magnetic sensor 44 used as the torque detection mechanism 42 performs a detection operation so that a drive stop control of the electric motor M is performed in a state in which the projecting portion 40*a* of the clutch cam surface 40 disposed on the facing surface of the internal gear 22 completely rides over the steel ball 32 so that the internal gear rotates and the clutch operation is completed. As a result, a state in which the driving power supply of the electric motor M is cut off while the clutch cam surface 40 has not completely ridden over the steel ball 32, so that the driver bit rotates in the return direction, thus making it impossible to complete screw tightening at a specified torque, can be reliably prevented.

Figure 4:
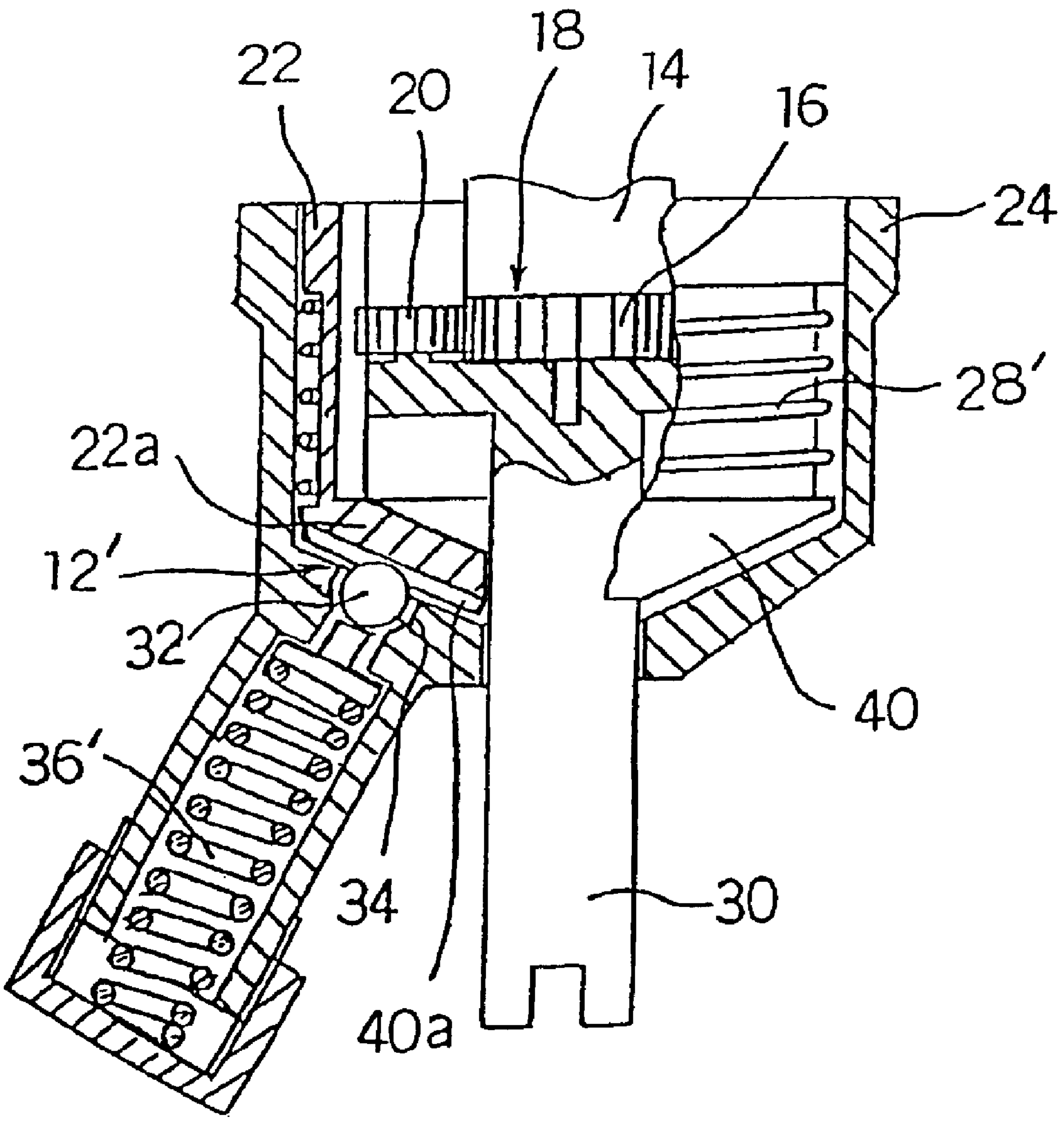
FIG. 4 is an enlarged schematic sectional view of the essential portion of another embodiment of an electrically driven rotating tool that uses the torque control system of the present invention.

FIG. 4 is an enlarged schematic sectional explanatory diagram of the essential portion of another embodiment of an electrically driven rotating tool working the torque control system of the present invention. More specifically, in this embodiment, the internal gear 22, which engages with the planetary gear 20 that constitutes the planetary gear mechanism 18 used as a speed-reduction mechanism in the above-described embodiment, is accommodated and disposed inside the cylindrical grip portion casing 24 of the electrically driven rotating tool 10 with a one-way clutch 28' interposed on the outer circumference; and alterations are made in the structure and disposition of the clutch mechanism and torque setting mechanism with respect to the closed bottom portion 22*a* of the internal gear 22. Furthermore, for convenience of description, constituent elements which are the same as in the structure of the embodiment shown in FIG. 1 are labeled with the same reference numerals, and a detailed description of such elements is omitted.

Furthermore, in the embodiment shown in FIG. 1, the clutch mechanism 12 is comprised of a clutch cam surface 40, on which a projecting portion 40*a* used to perform the clutch operation is disposed is formed on the outside surface of the closed bottom portion 22*a* of the internal gear 22, and a steel ball 32, which is disposed in a position that corresponds to the projecting portion 40*a* of this clutch cam surface 40; and this steel ball 32 is elastically held, via the torque adjustment spring 36 of the torque setting mechanism, in the upper end portion of a sleeve 38 which is disposed concentrically with the driven shaft 30. On the other hand, the embodiment shown in FIG. 4 is characterized in that the clutch mechanism 12' is constructed so that the closed bottom portion 22*a* of the internal gear 22 is formed in a conical shape, a clutch cam surface 40 on which a projecting portion 40*a* that is used to perform the clutch operation is disposed is formed on the conical outside surface, and a steel ball 32 is disposed in a position that corresponds to the projecting portion 40*a* of this clutch cam surface 40; and this steel ball 32 is independently elastically held in an orientation that is inclined with respect to the driven shaft 30 via torque adjustment means such as a torque adjustment spring 36', etc., which is used as a torque setting mechanism.

More specifically, in this embodiment, since the closed bottom portion 22*a* of the internal gear 22 is formed in a conical shape, and since the clutch cam surface 40 is formed on the conical outside surface of the conical closed bottom portion 22*a,* the torque adjustment spring 36' can be independently positioned as shown in the drawings without setting the elastic holding of the corresponding steel ball 32 (which allows torque adjustment) in the same direction as the driven shaft 30. As a result, for example, the axial length of the coil spring used as the torque adjustment spring 36' can be sufficiently set so that the elasticity and durability is heightened, thus making it possible to obtain a long useful life. Meanwhile, the complicated conventional mechanism surrounding the driven shaft 30 is all eliminated, so that a simple structure is obtained, thus making it possible to improve the precision of torque control. When the torque is adjusted by means of the torque setting mechanism, this work can be performed at any time without any effect on the driven shaft 30.

Thus, in the present embodiment, independent positioning that has absolutely no effect on the driven shaft 30 can be performed when the torque is adjusted by means of the torque setting mechanism; accordingly, the torque adjustment means is not limited to a torque adjustment spring 36', and various types of torque adjustment means utilizing magnetic force, etc., can be employed. Furthermore, in regard to the setting of the torque detection mechanism 42 with respect to the internal gear 22 of the clutch mechanism 12' in the present embodiment, this can be set in exactly the same manner as in the structure shown for the above-described embodiment in FIGS. 3(*a*) and 3(*b*).

Preferred embodiments of the present invention are described above. However, the present invention is not limited to the above-described embodiments; and numerous design alterations can be made within limits that involve no departure from the spirit of the present invention.

(Merits of the Invention)

As is clear from the above-described embodiments, the present invention is a torque control system for an electrically driven rotating tool; and in this tool, a grip portion containing an electric motor is provided, a driven shaft used as a working shaft is coupled to the output shaft of an electric motor via a speed-reduction mechanism, a clutch mechanism equipped with a cam engaging section which severs the coupling between the output shaft and the driven shaft when a load torque that exceeds a predetermined value acts on the driven shaft is provided, a torque setting mechanism in which the engagement point of the clutch mechanism is adjusted as a set torque value is installed, and a torque detection mechanism which performs a drive stop control of the electric motor at the same time that the clutch operation (disengagement) of the clutch mechanism is detected is provided; and in the torque control system of the present invention, the torque detection mechanism is set so that the a drive stop control of the electric motor is performed at the same time as the detection operation of the torque detection mechanism in a state in which the cam engagement in the cam engaging section of the clutch mechanism is completely released and the clutch operation is completed. As a result, constant-torque tightening of screws, etc. can be performed appropriately and efficiently, and the device as a whole can be compact easily.

Furthermore, in the torque control system for electrically driven rotating tools of the present invention, a combination of a magnet and a magnetic sensor is used as a torque detection mechanism; and the magnet in this torque detection mechanism is disposed on a portion of the internal gear, and the magnetic sensor is provided so that this magnetic sensor performs a detection operation, in a position where the cam engagement is completely released and the clutch operation is completed, when the magnet is moved as a result of the rotation of the internal gear that is caused by the clutch operation (disengagement) of the clutch mechanism. Accordingly, numerous superior advantages are obtained. In other words, it is possible to accommodate all of the torque detection mechanism in a compact manner inside the cylindrical grip portion casing of the electrically driven rotating tool along with the driving control circuit of the electric motor (especially in cases where a brushless motor is used as the electric motor), and a long useful life and maintenance-free operation can be realized as a result of the non-contact operation of the electrically driven rotating tool, so that handling can be simplified.

Furthermore, in the torque control system for electrically driven rotating tools of the present invention, the clutch mechanism is structured so that the closed bottom portion of the internal gear is formed in a conical shape, a clutch cam surface on which a projecting portion that is used to perform a clutch operation (disengagement) is disposed is formed on the conical outside surface of the closed bottom portion, a steel ball is disposed in a position that corresponds to the projecting portion of this clutch cam surface, and this steel ball is independently elastically held in an orientation that is inclined with respect to the driven shaft via torque adjustment means such as a torque adjustment screw, etc. used as a torque setting mechanism. Accordingly, it is possible to accomplish the elastic holding of the steel ball (that allows torque adjustment) with respect to the conical clutch cam surface, independently in an orientation that is not in the same direction as the driven shaft using torque adjustment means such as a torque adjustment screw, etc. As a result, numerous superior advantages can be obtained. In other words, the axial length of the coil spring used as the torque adjustment spring can be sufficiently set so that the elasticity and durability can be heightened, thus making it possible to obtain a long useful life. In addition, since the area surrounding the driven shaft has a simple structure, the precision of torque control can be improved. Moreover, when the torque is adjusted by the torque setting mechanism, such adjustment can be performed simply at any time without having any effect on the driven shaft.

What is claimed is:

1. A torque control system for an electrically driven rotating tool, said tool comprising:

a grip portion containing therein an electric motor, a driven shaft coupled to an output shaft of said electric motor via a speed-reduction mechanism so as to be used as a working shaft, a clutch mechanism equipped with a cam engaging section which makes a clutch operation that severs a coupling between said output shaft and said driven shaft when a load torque that exceeds a predetermined value acts on said driven shaft, a torque setting mechanism in which an actuation point of said clutch mechanism to sever a coupling between said output shaft and said driven shaft is adjusted as a set torque value, and a torque detection mechanism which detects said clutch operation in a cam engaging section of said clutch mechanism to sever a coupling between said output shaft and said driven shaft and which performs a drive stop control of said electric motor wherein said cam engaging section of said clutch mechanism is comprised of a combination of a clutch cam surface and a steel ball, said clutch cam surface being formed with a projecting portion that makes a clutch operation on a circumference of said driven shaft, and said steel ball facing and elastically engaging with said clutch cam surface via said torque setting mechanism; and said torque detection mechanism is comprised of a magnet and a magnetic sensor provided on a circumference of said driven shaft, so that said torque detection mechanism detects completion of clutch operation which occurs when a load torque that exceeds a predetermined value acts on said driven shaft and said projecting portion of said clutch cam surface rides over said steel ball to release a cam engagement thus performing said drive stop control of said electric motor.

2. A torque control system for an electrically driven rotating tool, said tool comprising:

a grip portion containing therein an electric motor, a driven shaft coupled to an output shaft of said electric motor via a planetary gear speed-reduction mechanism so as to be used as a working shaft, an internal gear rotatably disposed in a cylindrical grip portion casing that surrounds said planetary gear speed-reduction mechanism, said internal gear engaging with a planetary gear of said speed-reduction mechanism, a clutch mechanism equipped with a cam engaging section which, in a location between said internal gear and said cylindrical grip portion casing, makes a clutch operation that severs a coupling, between said output shaft and said driven shaft when a load torque that exceeds a predetermined value acts on said driven shaft, a torque setting mechanism in which an actuation point of said clutch mechanism that severs a coupling between said driven shaft is adjusted as a set torque value, and a torque detection mechanism which detects said clutch operation of said clutch mechanism to sever a coupling between said output shaft and said driven shaft in said cam engaging section and performs a drive stop control of said electric motor wherein a cam engaging section of said clutch mechanism is comprised so that a sleeve is concentrically disposed on said driven shaft, an upper end portion of said sleeve is disposed so as to face a closed bottom portion of said internal gear, a clutch cam surface on which a projecting portion that performs said clutch operation is disposed is formed on said closed bottom portion of said internal gear, a steel ball is provided at said upper end portion of said sleeve in a position that corresponds to said projecting portion of said clutch cam surface and said sleeve is elastically held via said torque sitting mechanism, and said torque detection mechanism is comprised of a magnet which is disposed on one portion of an outside wall of said internal gear and a magnetic sensor which is disposed so as to face said magnet, and said torque detection mechanism detects completion of said clutch operation which occurs when a load torque that exceeds a predetermined value acts on said driven shaft and said projecting portion of said clutch cam surface rides over said steel ball to release a cam engagement, thus performing said drive stop control of said electric motor.

3. The torque control system for electrically driven rotating tools according to claim 2, wherein said clutch mechanism is comprised of:

said clutch cam surface being having said projecting portion used to perform said clutch operation, said clutch cam surface being formed on an outside surface of said closed bottom portion of said internal gear, and said closed bottom portion being in a conical shape, and said steel ball disposed in said position that corresponds to said projecting portion of said clutch cam surface, and wherein said steel ball is elastically held, via a torque setting mechanism which is disposed independently from said driven shaft, in an inclined orientation with respect to said driven shaft.

4. The torque control system for electrically driven rotating tools according to claim 1 or 2, wherein said electric motor of said electrically driven rotating tool is a brushless motor.

* * * * *